United States Patent
Berry

[15] 3,698,250
[45] Oct. 17, 1972

[54] ELECTRONIC SENSOR FOR DEVELOPING A VOLTAGE SIGNAL PROPORTIONAL IN MAGNITUDE TO DISPLACEMENT

[72] Inventor: James I. Berry, Livonia, Mich.
[73] Assignee: Ford Motor Company, Dearborn, Mich.
[22] Filed: Feb. 13, 1970
[21] Appl. No.: 11,238

[52] U.S. Cl..................................73/517, 340/262
[51] Int. Cl.............................................G01p 15/08
[58] Field of Search........73/517; 340/262; 324/83 A; 307/232

[56] References Cited
UNITED STATES PATENTS 3,330,972   7/1967   Malan......................307/232 X
3,124,755   3/1964   Williamson et al....307/232 X Primary Examiner—Jerry W. Myracle
Attorney—John R. Faulkner and Donald J. Harrington

[57] ABSTRACT

A displacement sensing electronic circuit comprising an oscillator connected to the input of a resonant circuit, said resonant circuit including an inductance element having relatively displaceable parts whereby the inductance may be changed in proportion to displacement of the parts to vary the phase relationship between the oscillator output and the resonant circuit output, and a bistable multi-vibrator circuit adapted to receive the output signals of the oscillator and the resonant circuit, the duty cycle for the output signal for the multi-vibrator circuit being proportional to the displacement of the relatively movable parts of the inductance element.

5 Claims, 7 Drawing Figures

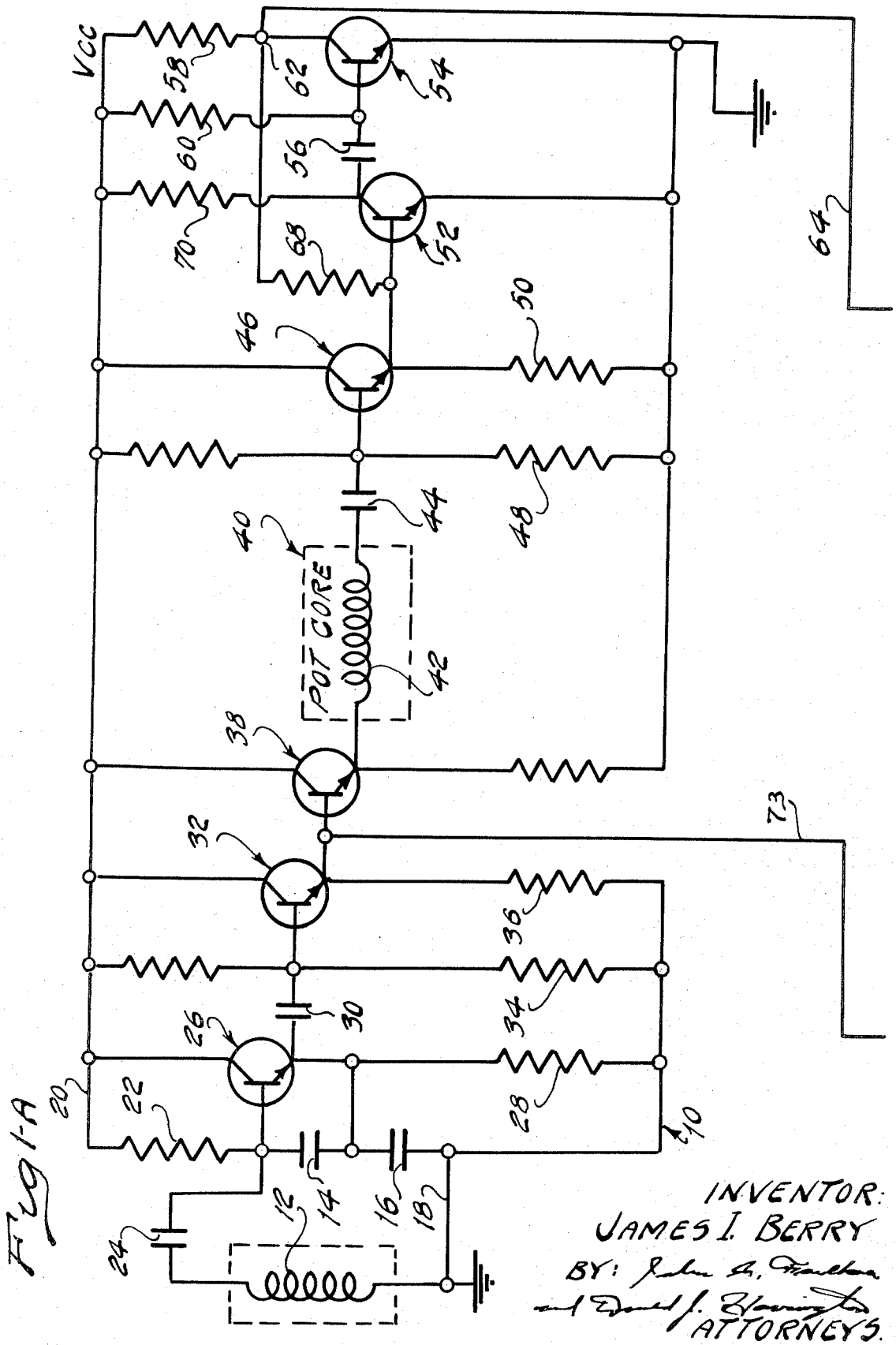
Fig 1-A
INVENTOR:
JAMES I. BERRY
BY: [signatures]
ATTORNEYS.

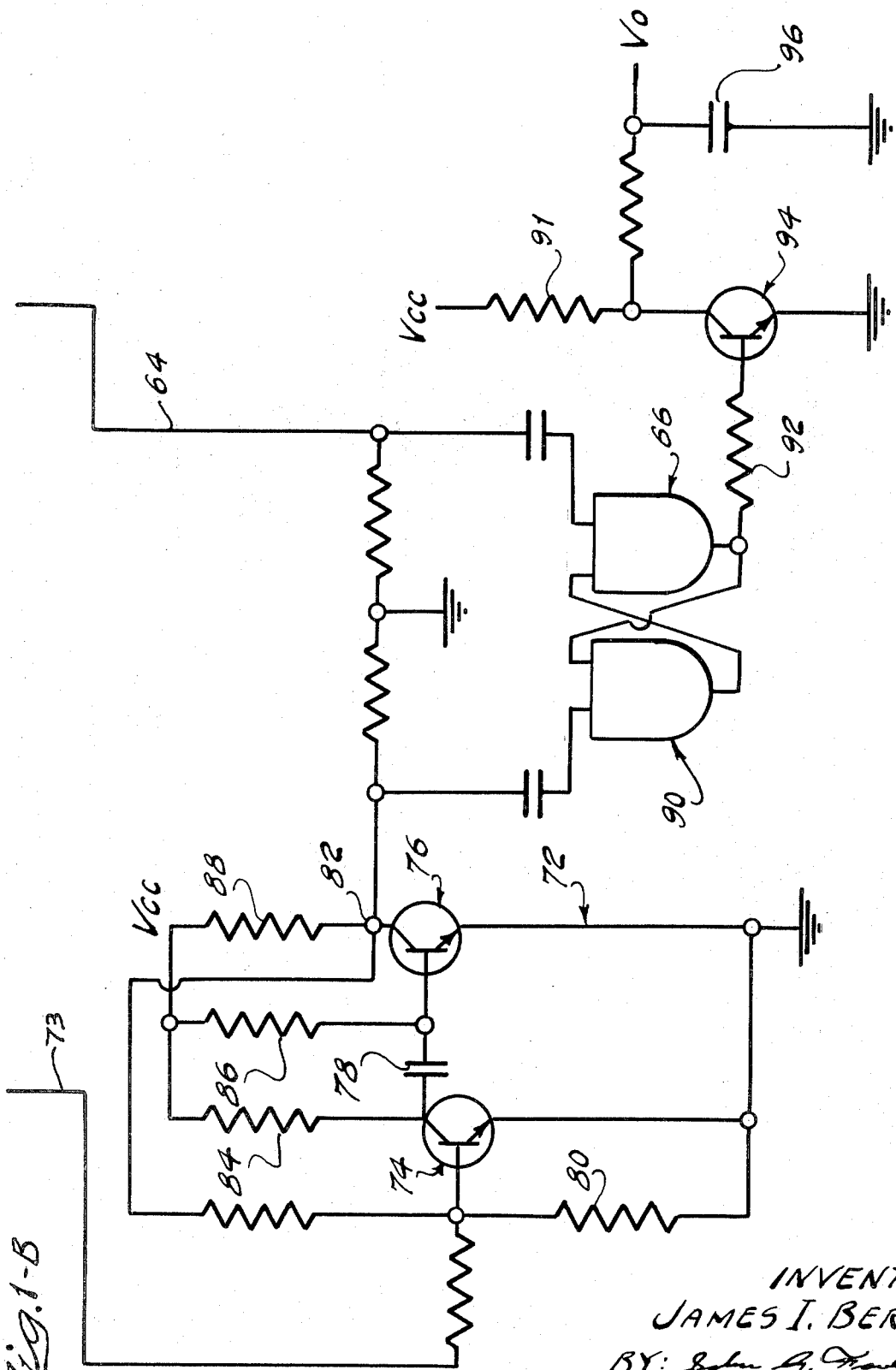
Fig.1-B

Fig 5-A

INVENTOR:
JAMES I. BERRY
BY: ATTORNEYS 3,698,250

1

ELECTRONIC SENSOR FOR DEVELOPING A VOLTAGE SIGNAL PROPORTIONAL IN MAGNITUDE TO DISPLACEMENT

GENERAL DESCRIPTION OF THE INVENTION

The improvements of my invention can be adapted readily for detecting forces due to acceleration or to pressure forces acting upon a circuit element that is sensitive to these variables. In the embodiment described in this disclosure my invention serves as an accelerometer for detecting linear acceleration of a moving body, such as an automotive vehicle. The acceleration signal that is developed may be utilized in an anti-skid brake system such as that described in the co-pending application of Vanderberg and Jania, Ser. No. 3122, filed Jan. 15, 1970, or in the anti-skid brake system described in my co-pending application, Ser. No. 3667 filed Jan. 19, 1970. Both of these co-pending applications are assigned to the assignee of this invention.

My improved sensor utilizes phased modulation for two voltage signals and is adapted to sense a phase shift between the two signals. The phase modulation is accomplished by varying the inductance of a resonant circuit, the input side of which receives a signal from a signal source of constant frequency. The inductance comprises inductance windings and a core which is relatively displaceable with respect to the windings. The core is mounted on a spring suspension so that it may move relative to the windings with a complete absence of mechanical friction between the relatively movable parts. The mass of the core and the elements that are joined to it are subjected to inertia forces when the accelerometer is moved linearly with a varying velocity. When the accelerometer is used in an anti-skid brake system for a vehicle, the accelerometer would be mounted on a fixed part of the vehicle by a structure with the path of movement of the relatively displaceable parts of the accelerometer arranged in the direction of motion of the vehicle.

Any change in inductance induced by the presence of inertia forces on the relatively displaceable parts of the accelerometer produces a phase shift in an RLC resonant circuit of which the inductance coil and core are a part. The change in inductance is detected by a pair of trigger circuits and a bistable multi-vibrator or flip-flop circuit, the trigger circuits providing the input signals for the flip-flop circuit. The output from the flip-flop circuit may be measured by using a filter adapted to detect the average value of the output pulses. The average value, of course, is a measure of the duty cycle which is an indication of phase shift, and this in turn is an indication of the displacement of the relative displacement of the core with respect to the inductance windings.

The inductance of the circuit may be changed also by varying other circuit characteristics, such as resistance or capacitance. In the particular embodiment disclosed in this specification, however, the inductance is the characteristic I have chosen as a variable while the other two circuit characteristics remain constant.

BRIEF DESCRIPTION OF THE FIGURES OF THE DRAWING

FIGS. 1A and 1B show in schematic form a circuit that may be used as an accelerometer in an anti-skid brake system.

2

Figure 2:
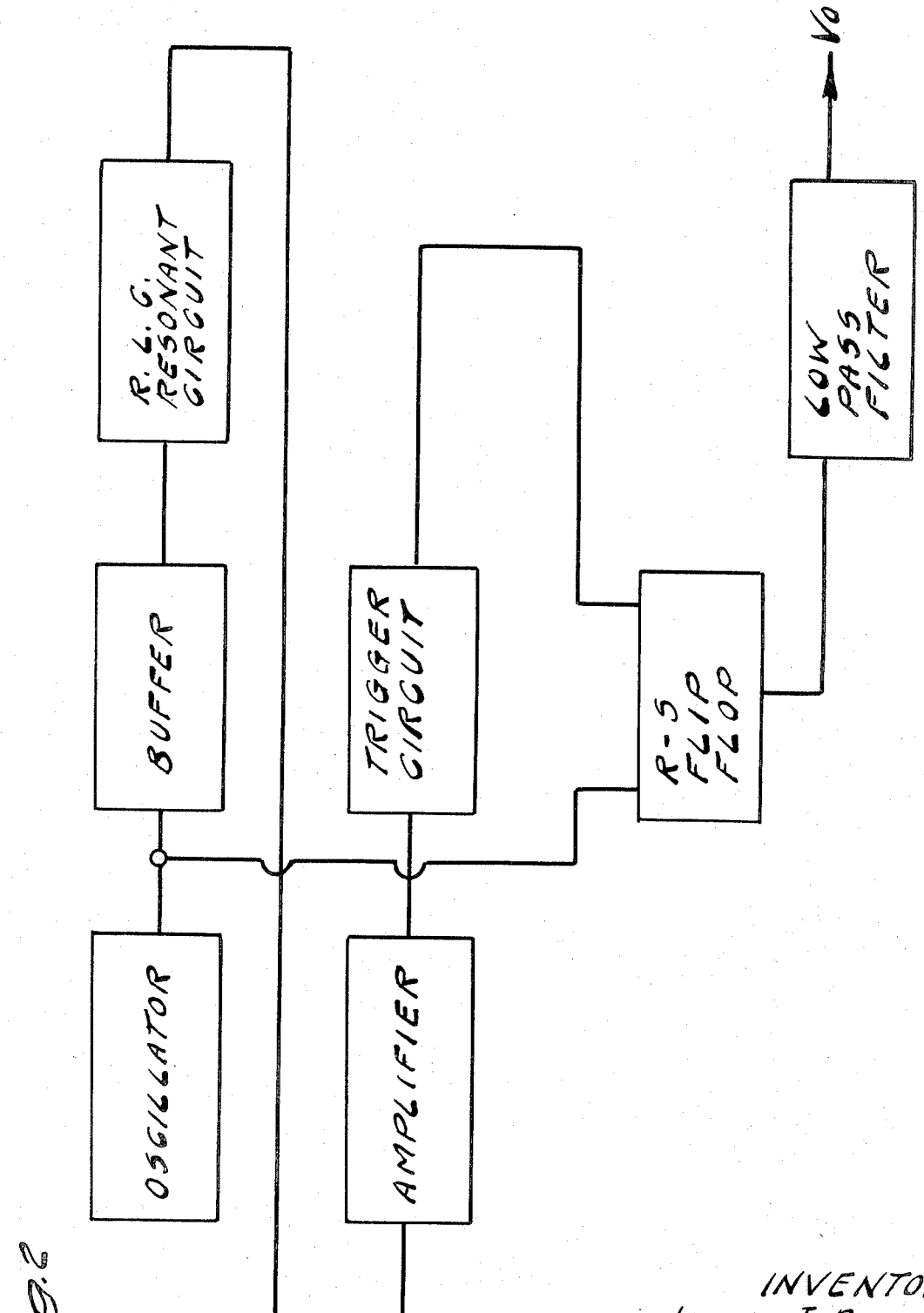

FIG. 2 is a block diagram illustrating the circuit functions for the circuit in FIGS. 1A and 1B.

Figure 3:
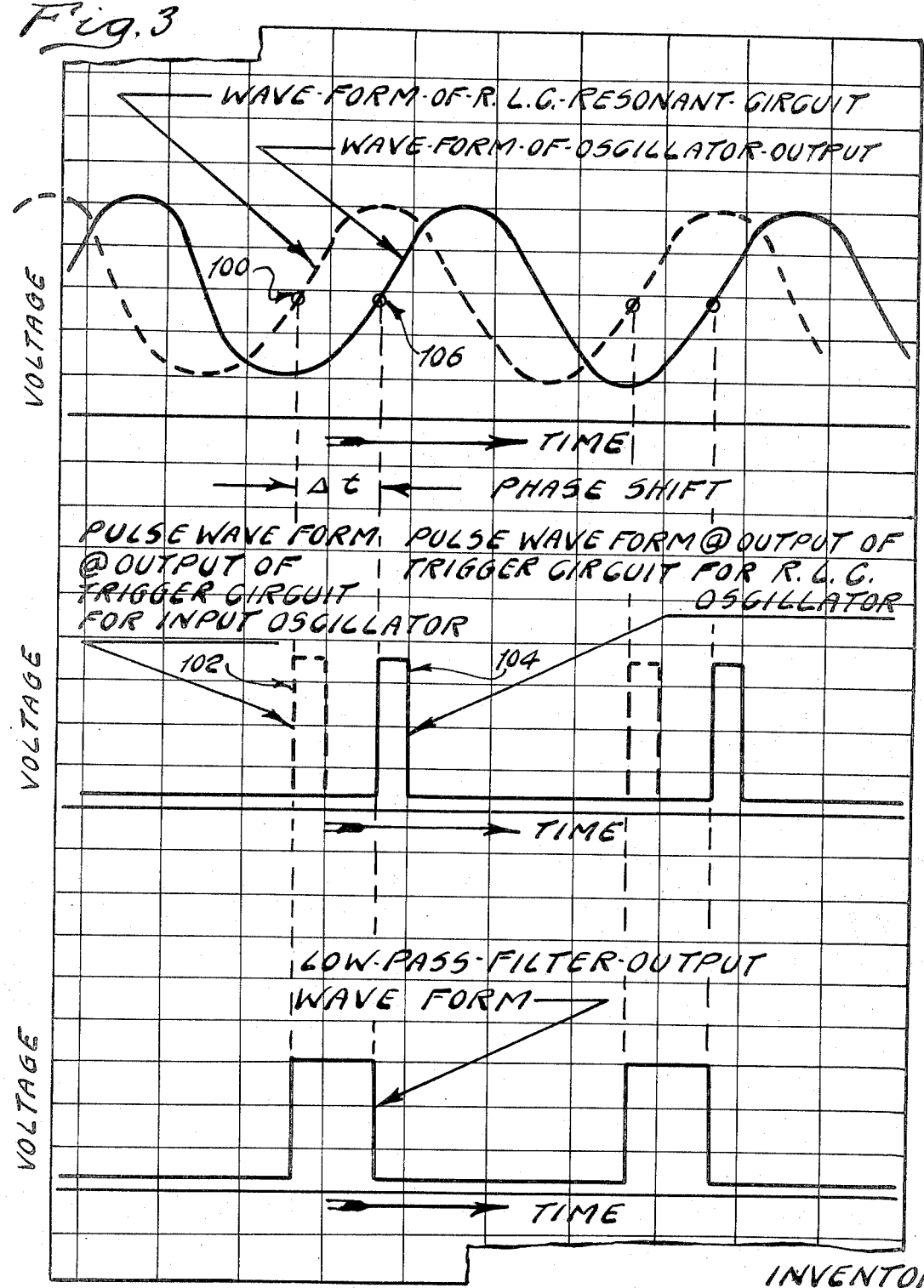

FIG. 3 is a chart showing the various wave forms developed in the circuit of FIGS. 1A and 1B.

Figure 4:
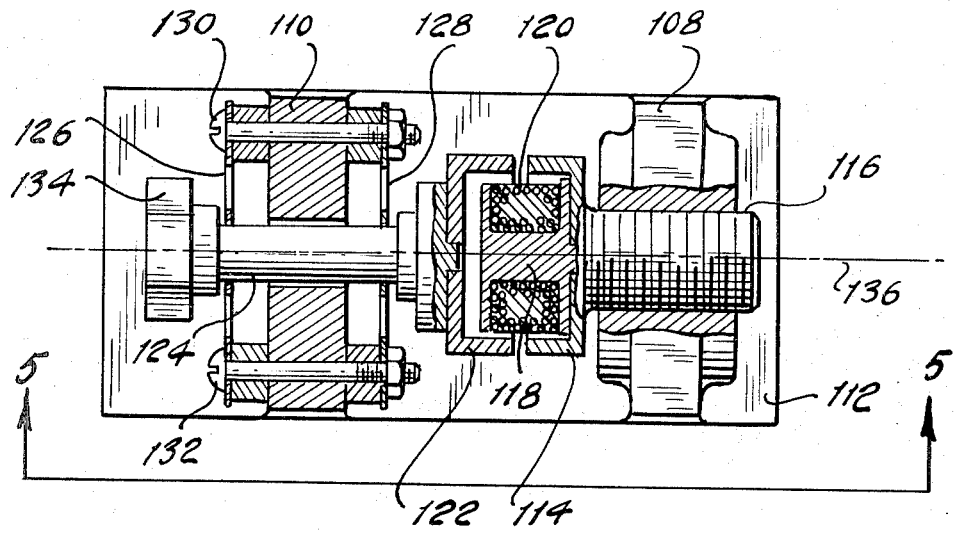
Figure 5:
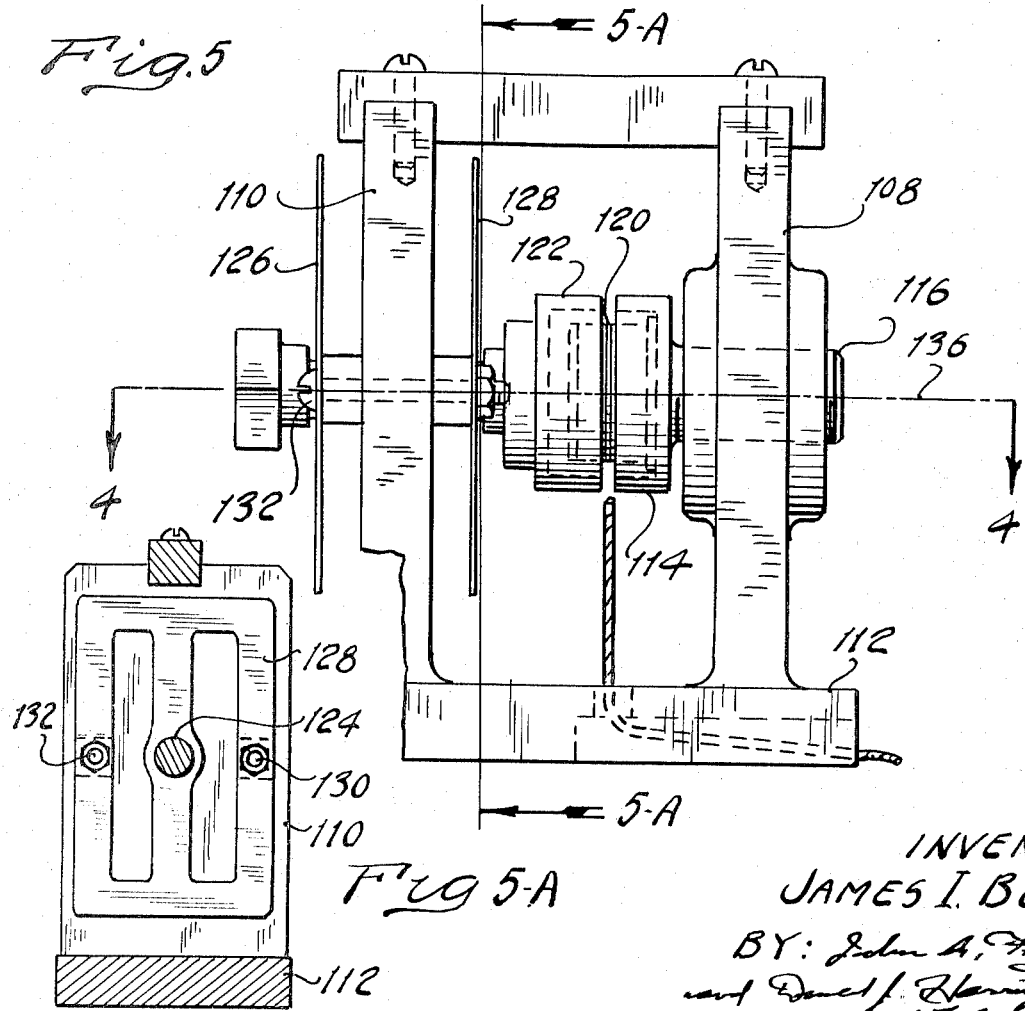

FIG. 4 shows a partial cross sectional view along section line 4—4 of FIG. 5 the relatively movable parts of the inductance which form a part of the resonant circuit used in FIGS. 1A and 1B.

FIG. 5 is a side elevation view of the structure of FIG. 4 as seen from the plane of section line 5—5 of FIG. 4.

FIG. 5A is a cross sectional view taken along section line 5A—5A of FIG. 5.

PARTICULAR DESCRIPTION OF THE INVENTION

In FIG. 1A, numeral 10 designates an input oscillator which comprises an inductance coil 12 and a pair of capacitors 14 and 16. Inductance coil 12 is grounded at 18 and a DC voltage supply 20 is connected through resistor 22 to one side of capacitor 24. The opposite side of the capacitor is connected to the other side of the inductance coil 12.

The oscillator circuit includes an NPN transistor 26 having a collector connected to the voltage source 20. The base of the transistor 26 is connected to one side of the capacitor 24. The emitter for the transistor 26 is connected through resistance 28 to the ground. The emitter is connected also to a point situated between the two capacitors 14 and 16, which form a part of the oscillator circuit together with the inductance 12.

The capacitor 24 serves to isolate the inductance coil 12 from the base of transistor 26. Without the capacitor 24 an unwanted DC voltage bias on the base of transistor 26 would occur because of the relatively low resistance of the inductance coil 12.

The oscillator circuit of which the inductance 12 and the capacitors 14 and 16 are a part create sine wave voltage pulses which are distributed to the base of the transistor 26 thereby inducing a sine wave voltage signal at capacitor 30, which connects the emitter for the transistor 26 to the base of the transistor 32. This provides an AC coupling between the oscillator circuit and the transistor 32, which serves as an impedance buffer.

The pulsating charges induced in capacitor 30 are discharged through resistor 34 to ground. The pulsating signals at the base of the transistor 32 due to capacitor 30 cause a collector current to flow through resistor 36. This produces a pulsating voltage signal because of the voltage drop across resistor 36. These pulsating voltage signals are distributed to the base of the second impedance buffer transistor 38. Both transistors 36 and 38 are so-called "emitter-follower" transistors, and the same voltage signal at the emitter for transistor 38 appears as the output signal of the oscillator.

An RLC series-arranged, resonant oscillator is shown at 40. It includes an inductance coil 42 and a series-arranged capacitor 44, one side of which is connected to the base of an emitter-follower transistor 46. The current flow path from one side of the capacitor 40 to the ground includes resistor 48.

Collector current through transistor 46 is distributed through resistor 50 thereby creating a base-emitter bias for transistor 52, which forms a part of a trigger circuit known as a "one-shot" multi-vibrator.

The multi-vibrator of which transistor 52 forms a part includes also a second transistor 54 with a base connected to one side of capacitor 56 and an emitter connected to the ground. Resistor 58 is located in the collector circuit.

The voltage discharge flow path for the capacitor 56 includes resistor 60, the magnitude of the resistance of which determines the frequency of oscillation of the multi-vibrator.

The voltage pulses appearing at point 62 in the collector circuit for transistor 54 are distributed through line 64 to the input side of a gate circuit 66.

At the instant that a voltage pulse appears at the base of the transistor 52, the transistor 52 is not conducting and the transistor 54 is conducting. Because of the presence of collector current in transistor 54, the voltage at point 62 is low. This voltage is distributed through resistor 68 to the base of the transistor 52. The reduced magnitude of the signal at point 62 and the relatively high resistance of resistor 52 creates a minimum base-emitter voltage bias for transistor 68, and no collector current flows through the collector circuit for the transistor 52, said collector circuit including resistor 70. As soon as a voltage pulse appears at the base of transistor 52, a base-emitter voltage bias is created thereby causing collector current to flow. This creates a charge on one side of the capacitor 56 which is connected to the collector circuit for transistor 52. The same charge immediately appears on the base for the transistor 54 thereby causing a negative bias which interrupts the flow of collector current through resistor 58. The voltage at point 62 then rises immediately to a relatively high value. This augments the voltage bias on the base of the transistor 52 thereby further increasing the flow of collector current through resistor 70.

The timing of the capacitor-resistance circuit, which includes capacitor 56 and resistor 60, is such that this charge on the base for the transistor 54 will be discharged. The reverse bias on the base for the transistor 54 then is relieved thereby permitting once again the flow of collector current through transistor 54. This reduces the voltage at point 62, and it reduces also the base-emitter voltage bias on transistor 52 thereby interrupting the flow of collector current through transistor 52. The voltage signal at point 62, which is received by the gate circuit 66, then is of square wave form and of relatively narrow width.

A second trigger circuit 72 is connected to the output side of the oscillator through line 73. The circuit 72 may be identical to the trigger circuit described in the preceding paragraph. It also includes a pair of transistors, which are identified respectively be reference characters 74 and 76, the collector of transistor 74 being connected to the base of transistor 76 through capacitor 78.

Resistor 80 creates a base-emitter voltage bias for transistor 74. The base is connected directly to the emitter for transistor 32 so that the base is subjected to the voltage pulses developed by the oscillator. The circuit 72 functions the same way as the circuit previously described to produce pulsating voltages at point 82. As in the earlier circuit, the circuit 72 includes three resistors: 84, 86 and 88.

The voltage pulses at point 82 are distributed to a second gate circuit identified by reference character 90, which forms a counterpart for the gate circuit 66.

For a particular description of the gate circuits 66 and 90, reference may be made to my co-pending application; Ser. No. 3667 filed Jan. 19, 1970 where I have illustrated a bistable multi-vibrator. Other forms of gate circuits may be employed, however, if this is desired.

The output of the gates 66 and 90 is distributed through resistor 92 to the base of transistor 94. Resistor 91 in the collector circuit creates a voltage drop which is received by capacitor 96. The charge stored by the capacitor 96 is of square wave form. Transistor 94 and capacitor 96 function as a low-pass filter. Other types of filters, however, could be used if desired.

The presence of a voltage signal at the output side of the oscillator triggers the formation of a narrow wave pulse by the circuit 72. The presence of a voltage signal on the output side of the resonant oscillator causes the trigger circuit on the output side of the oscillator to create another narrow wave pulse. Each pulse is distributed to the gate circuits 66 and 90. A phase shift will occur between these two pulses when the inductance of the coil 42 is varied. The wave form for the RLC resonant circuit and the oscillator output wave form are illustrated in FIG. 3. When the magnitude of the voltage of the sine wave output for the resonant circuit reaches a point such as that indicated by reference character 100, a voltage pulse 102 is created by the trigger circuit 72. The width of the trigger circuit pulse 102 is determined by the capacitance of capacitor 78 and the resistance of resistor 86. If the inductance of coil 42 is of such magnitude that a phase shift occurs, a companion pulse 104 is created by the other trigger circuit. When the magnitude of the voltage for the oscillator output sine wave reaches a value such as that shown at 106, the phase shift is indicated in FIG. 3 by the symbol Dt. The magnitude of the duty cycle for the low-pass filter is directly dependent upon the magnitude of the phase shift. The beginning of the output wave signal at the low-pass filter occurs at the instant the pulse 102 begins. The output signal for the low-pass filter ends the instant the pulse 104 begins. The average value for the low-pass filter output then is dependent on the phase shift, which in turn is determined by the variation in the inductance of the variable inductance coil 42. The inductance of the coil 42 is varied by inertia forces which act on the relatively movable parts of the inductance core. The variable inductance and the movable core portions are illustrated in FIGS. 4 and 5.

The structure of FIGS. 4 and 5 include a supporting bracket 108, a second bracket 110 and a common base 112. An inductance element in the form of a ferrous cup 114 has a threaded extension 116 screwed into the bracket 108 and held fast by it. Screw 116 holds core portion 118 about which is wound inductance windings 120.

A second cup formed of ferrous material is shown at 122. It surrounds the windings 120 and is arranged in juxtaposed relationship with respect to the ferrous core cup 114. The cup 122 is supported by shaft 124 which is suspended by thin leaf spring elements 126 and 128. The margins of the spring elements 126 and 128 are fastened securely to the bracket 110, suitable screws 130 and 132 being provided for this purpose. If desired, shaft 124 can be weighted as shown at 134 to provide the desired inertia.

The base 112 is secured to the vehicle chassis or body structure so that the direction of the motion of the vehicle corresponds to the direction of the axis 136 of the windings 120 and the core cups 122 and 114. If the base 112 is accelerated from right to left as viewed in FIG. 5, the gap between the core portions 114 and 122 will decrease due to spring deflection. This increases the inductance of the element 142 thereby causing a phase shift to occur for the two voltage signals as indicated in FIG. 3. Upon deceleration, the gap will increase thereby decreasing the amount of the phase shift.

It is apparent from the foregoing that the output signal from the low-pass filter, the average value of which can be measured will represent the degree of acceleration or deceleration of the vehicle. This signal can be used in an anti-skid brake system such as that described in my co-pending application above identified.

Having thus described the preferred form of my invention, what I claim and desire to secure by U.S. Letters Patent is:

1. A phase modulating displacement sensor comprising an oscillator circuit connected to a voltage source, said oscillator circuit having an inductance element and a capacitor element connected in a pulsating circuit relationship, one of said oscillator circuit elements having relatively displaceable parts, means for mounting one part of said one circuit element for movement relative to the other part in response to an inertia force acting upon said one part due to its mass, a resonant circuit having an input side connected to the output side of said oscillator circuit, the voltage pulses received from said oscillator circuit inducing pulses in said resonant circuit, an output filter and means for gating the distribution of each of the voltage pulses to the input side of said filter whereby the duty cycle of said filter is proportional to the phase difference between said pulses.

2. The combination as set forth in claim 1 wherein said resonant circuit comprises an electrical inductance element having an inductance winding portion and a core portion movable relative to said inductance winding portion, means for mounting said core portion and said winding portion on supporting structure, the mounting means for one of said inductance element portions being displaceable by an inertia force due to the mass of said one portion, said inductance element thereby causing a change in the relative position of said core portion and said inductance winding portion to produce a phase shift in the output side of said resonant circuit that is dependent upon the magnitude of said force.

3. The combination as set forth in claim 2 wherein said connection between said filter and each of said oscillator and resonant circuits comprises a first one-shot multi-vibrator having an input side connected to the output side of said oscillator circuit, a gate circuit connecting the output side of oscillator circuit to said filter, a second one-shot multi-vibrator having an input side connected to the output side of said resonant circuit and an output side connected through said gate circuit to said filter whereby each one-shot multi-vibrator establishes a pulse voltage signal when the output voltage of said oscillator circuit on its input side reaches a predetermined value thereby triggering the beginning and end of a square wave voltage signal, the duty cycle for which is an indication of the relative displacement of said inductance windings and inductance core portion.

4. The combination as set forth in claim 2 wherein the relatively movable parts of said inductance element in said resonant circuit are adapted to be displaced by inertia forces acting thereon, and means for yieldably resisting such relative displacement due to the imposition of said inertia forces whereby the magnitude of the phase shift for the output signal of said oscillator circuit and said resonant circuit is dependent upon the magnitude of the inertia forces acting on said relatively movable parts.

5. The combination as set forth in claim 3 wherein the relatively movable parts of said inductance element in said resonant circuit are adapted to be displaced by inertia forces acting thereon, and means for yieldably resisting such relative displacement due to the imposition of said inertia forces whereby the magnitude of the phase shift for the output signal of said oscillator circuit and said resonant circuit is dependent upon the magnitude of the inertia forces acting on said relatively movable parts.

* * * * *

UNITED STATES PATENT OFFICE
CERTIFICATE OF CORRECTION

Patent No. 3,698,250         Dated October 17, 1972

Inventor(s) James I. Berry

It is certified that error appears in the above-identified patent and that said Letters Patent are hereby corrected as shown below:

Column 5, line 25, cancel "said oscillator" and substitute --a resonant--; line 27, cancel "oscillator" and substitute --resonant--; line 31, cancel "a" and substitute --said--; line 35, after "and" insert --connecting--.

Column 6, line 10, cancel "connection" and substitute --connecting means--; line 14, after "of" insert --said--.

Signed and sealed this 29th day of October 1974.

(SEAL)
Attest:

McCOY M. GIBSON JR.
Attesting Officer

C. MARSHALL DANN
Commissioner of Patents